(12) United States Patent
Sanchez et al.

(10) Patent No.: US 11,194,905 B2
(45) Date of Patent: Dec. 7, 2021

(54) AFFECTEDNESS SCORING ENGINE FOR CYBER THREAT INTELLIGENCE SERVICES

(71) Applicant: International Business Machines Corporation, Armonk, NY (US)

(72) Inventors: Barny S. Sanchez, Charlton, MA (US); Duc H. Nguyen, Atlanta, GA (US); Edward P. Gurnee, Dunwoody, GA (US); Ratnakar Pawar, Dunwoody, GA (US); Carlos J. Muentes, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 16/378,599

(22) Filed: Apr. 9, 2019

(65) Prior Publication Data

US 2020/0327223 A1    Oct. 15, 2020

(51) Int. Cl.
G06F 21/55     (2013.01)
G06F 16/2455   (2019.01)

(52) U.S. Cl.
CPC ........ *G06F 21/554* (2013.01); *G06F 16/2455* (2019.01); *G06F 2221/034* (2013.01)

(58) Field of Classification Search
None
See application file for complete search history.

(56) References Cited

U.S. PATENT DOCUMENTS

| | | | |
|---|---|---|---|
| 9,223,971 B1 * | 12/2015 | Bartolomie | H04L 63/1425 |
| 9,584,541 B1 * | 2/2017 | Weinstein | H04L 29/06884 |
| 10,643,216 B2 * | 5/2020 | Sadaghiani | G06N 20/20 |
| 2012/0096552 A1 | 4/2012 | Paek et al. | |
| 2014/0201836 A1 * | 7/2014 | Amsler | H04L 63/20 726/23 |
| 2014/0259170 A1 * | 9/2014 | Amsler | H04L 63/20 726/23 |
| 2015/0163242 A1 | 6/2015 | Laidlaw et al. | |
| 2015/0207813 A1 * | 7/2015 | Reybok | H04L 63/145 726/22 |

(Continued)

*Primary Examiner* — Michael Pyzocha
(74) *Attorney, Agent, or Firm* — Jeffrey S. LaBaw; David H. Judson

(57) ABSTRACT

A network-accessible cyber-threat security analytics service is configured to characterize and respond to a description that includes threat indicators (e.g., IOCs), and an initial severity. Enterprises register with the service by providing identifying information, such as industry, geographies, and the like. For each threat indicator, a query is sent to each of a set of one or more security knowledge bases, and at least some of the queries are scoped by the enterprise industry/geo information specified. The knowledge bases may vary but typically include: a managed security service, a cyber threat intelligence service, and a federated search engine that searches across one or more enterprise-connected data sources. Responses to the queries are collected. A response provides an indication whether the threat indicator identified in the query has been sighted in the knowledge base and the frequency. The system then adjusts the initial severity to reflect the indications returned from querying the security knowledge bases.

28 Claims, 8 Drawing Sheets

(56) References Cited

U.S. PATENT DOCUMENTS

| | | | |
|---|---|---|---|
| 2015/0215334 A1* | 7/2015 | Bingham | H04L 63/1425 726/23 |
| 2015/0373043 A1* | 12/2015 | Wang | G06F 21/6254 706/12 |
| 2016/0197941 A1* | 7/2016 | Smith | H04L 63/1408 726/22 |
| 2016/0350406 A1* | 12/2016 | Byron | G06F 16/3344 |
| 2017/0134171 A1* | 5/2017 | Woxland | H04W 12/04071 |
| 2017/0171231 A1* | 6/2017 | Reybok, Jr. | H04L 63/14 |
| 2017/0243008 A1* | 8/2017 | Cornell | G06Q 10/0633 |
| 2017/0272469 A1* | 9/2017 | Kraemer | H04L 63/1425 |
| 2017/0293738 A1* | 10/2017 | Bender | G16H 70/40 |
| 2018/0314834 A1* | 11/2018 | Sander | G06F 21/554 |
| 2019/0158525 A1* | 5/2019 | Rostami-Hesarsorkh | G06N 5/003 |
| 2019/0166164 A1* | 5/2019 | Yamada | H04L 63/1441 |
| 2019/0334942 A1* | 10/2019 | Wicker | G06F 21/55 |
| 2020/0053115 A1* | 2/2020 | Hodgman | H04L 63/1408 |
| 2020/0314124 A1* | 10/2020 | Reybok, Jr. | H04L 63/0428 |

* cited by examiner

AFFECTEDNESS SCORING ENGINE FOR CYBER THREAT INTELLIGENCE SERVICES

BACKGROUND

Technical Field

This disclosure relates generally to cybersecurity offense analytics.

Background of the Related Art

Today's networks are larger and more complex than ever before, and protecting them against malicious activity is a never-ending task. Organizations seeking to safeguard their intellectual property, protect their customer identities, avoid business disruptions, and the like, need to do more than just monitor logs and network flow data; indeed, many organizations create millions, or even billions, of events per day, and distilling that data down to a short list of priority offenses can be daunting.

Known security products include Security Incident and Event Management (SIEM) solutions, which are built upon rule-based mechanisms to evaluate observed security events. SIEM systems and methods collect, normalize and correlate available network data. One such security intelligence product of this type is IBM® QRadar® SIEM, which provides a set of platform technologies that inspect network flow data to find and classify valid hosts and servers (assets) on the network, tracking the applications, protocols, services and ports they use. The product collects, stores and analyzes this data, and it performs real-time event correlation for use in threat detection and compliance reporting and auditing. Using this platform, billions of events and flows can therefore be reduced and prioritized into a handful of actionable offenses, according to their business impact. While SIEM-based approaches provide significant advantages, the rules are either hard coded or parameterized with a threat feed with concrete indicators of compromise (IoCs). Thus, typically these solutions are able to detect only known threats, but for unknown threats, e.g., detected by means of a behavior based rule, are unable to identify root cause and assist the security analyst. Moreover, these systems can present implementation challenges, as they often rely on manual curation of any semi-structured and unstructured threat feeds, i.e., natural language text, by means of security professionals reading threat advisories and extracting IoCs.

In particular, Security Operations Center (SOC) analysts who use such systems often are confronted with a large number of offenses every day. The majority of their time is spent to understand and analyze these offenses, confirm their validity, find related information, and attempt to find appropriate actions to resolve them. Upon analysis of a potential threat, e.g., using cognitive cybersecurity analytics methods, a plurality of hypotheses about the background or cause of a threat may be generated. When analyzing a cybersecurity alert, however, a central problem a security analyst often faces is the presence of multiple possible hypothesis regarding the potential root cause of a collection of events. To address this problem, there exist a variety of methods to generate hypotheses from a set of observed behaviors, and these methods include both automated techniques (e.g., using cognitive security analytics) that exhaustively test all observables for all hypothesis against historical data, to manual approaches (e.g., using search engines) that rely upon analyst intuition regarding what observables relate to a given hypothesis to be validated against that data. Even so, it may be that none of these hypotheses are sufficiently supported by the observables at hand during the investigation. In such case, significant additional manual analysis of potentially related events is required, and this often involves tedious loading of historical data files and searching for indicators that increase the confidence in one or more hypotheses.

While the known automated approaches may reduce the analyst's workload, they put heavy query and processing load on data archival systems, thereby increasing the expense associated with any remediation or mitigation efforts that must be taken to address the cybersecurity threat.

Solution offerings of the type described above also are limited in their scope in that they only consider history associated with the threat, indicators of compromise, their arbitrary individual ranking of maliciousness, evolution of cyber-attack methods, tools that enable or exploit the threat, sightings of the threat in the field, groups or actors involved, campaigns connected to this or similar threats, and the like. Accordingly, often it is left to individuals in the organization (and possibly even non-technical people) to determine if a threat is relevant to the enterprise and warrants response. This type of ad-hoc decision-making is error prone and often consumes much more time than is required of an organization's information security team. The problem is exacerbated when the customer has a large inventory of devices that can be affected by various different types of cyber threats.

More generally, and when a new cyber-attack (threat) is discovered, enterprises often fundamentally struggle with several questions. The first question is whether the threat is relevant? This question refers to the likelihood of impact. If the threat is relevant, the next question is whether the enterprise is affected by it? This question refers to the impact of a threat. If the enterprise is affected by the threat, the follow-on questions are then what are the nature and scope of that effect? This inquiry refers to the severity of the impact. Although existing cybersecurity analytics products and services often provide useful insights, there remains a need to provide customers, preferably at a glance, the ability to know if a cyber threat will affect them and, if so, to what extent.

The techniques of this disclosure address this need in the art.

BRIEF SUMMARY

A network-accessible cyber-threat security analytics service is configured to characterize and respond to cyber threat assessments, such as an advisory that includes threat indicators (e.g., IOCs). An advisory of this type typically is a text description of a cyber-attack, and typically it includes an initial severity indicia (score) assigned as a result of a security analysis. Enterprises register with the service by providing identifying information, such as industry, geographies, and the like. One or more (and preferably several) security knowledge bases are programmatically coupled to the service. The knowledge bases vary but typically include: a managed security service that collects, aggregates and anonymizes security events from multiple entities, a cyber threat intelligence service that generates and provides knowledge graph-based per threat indicator risk indicia, and a federated search engine that searches across one or more enterprise-connected SIEM or non-SIEM data sources. The number and type of the security knowledge bases may vary, and these knowledge sources may be static or changing, internally-hosted or externally-accessible, etc. In a typical embodiment, a knowledge base has an application programming interface (API) that is configured to be queried, and to return responses.

In response to receipt of the advisory, and preferably for each threat indicator therein, a query is sent to each of a set of one or more security knowledge bases, and at least some of the queries are scoped by the enterprise industry/geo information specified. Responses to the queries are collected. A response provides an indication whether the threat indicator identified in the query has been sighted (i.e. seen) in data sources comprising the security knowledge base. The system then adjusts the initial severity score to reflect the indications (sightings) returned from querying the security knowledge bases, as well as relative weightings assigned to those knowledge sources to thereby compute a priority (for taking action). An action is then taken based on the priority. Typically, the action is one of: adjusting an investigative workflow, issuing a notification or alert, updating a security analysis visualization, and providing a command to execute an external computing action.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
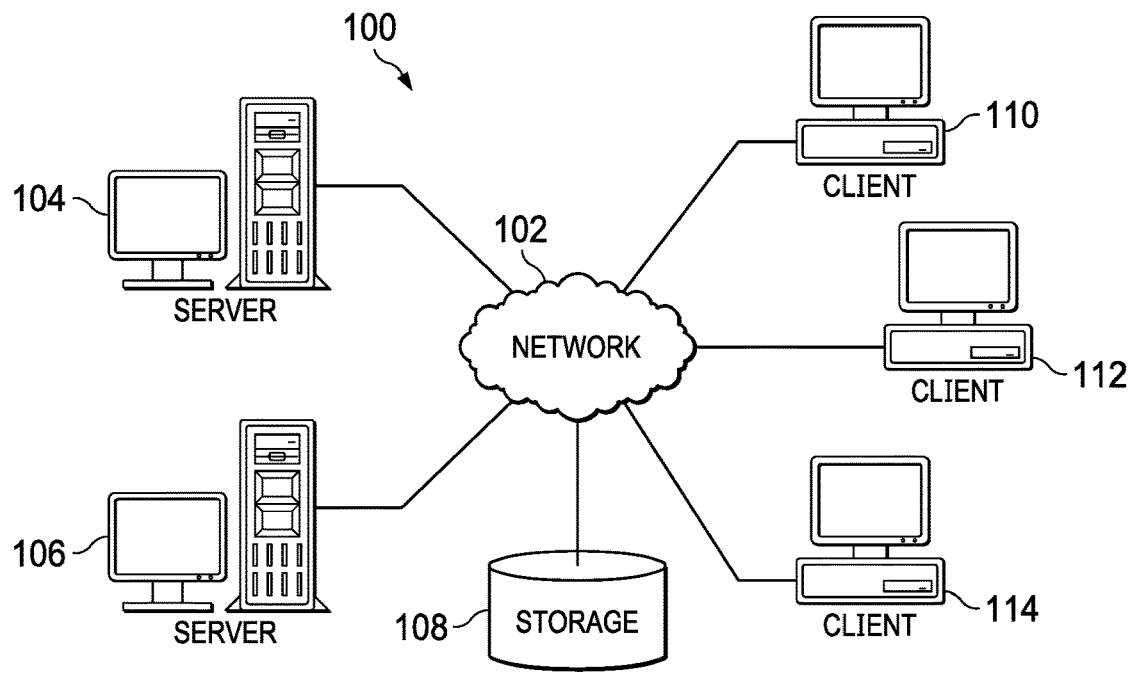
FIG. 1 depicts an exemplary block diagram of a distributed data processing environment in which exemplary aspects of the illustrative embodiments may be implemented.
Figure 2:
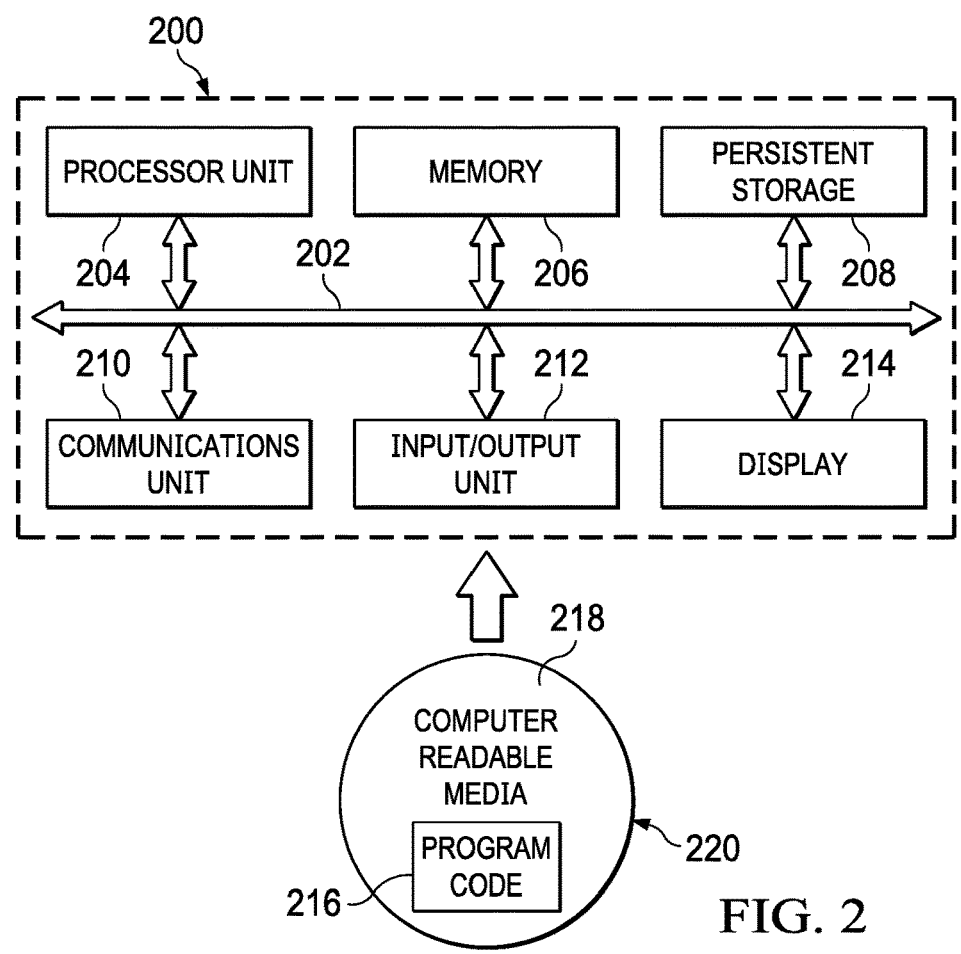
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform with Incident Forensics

Figure 3:
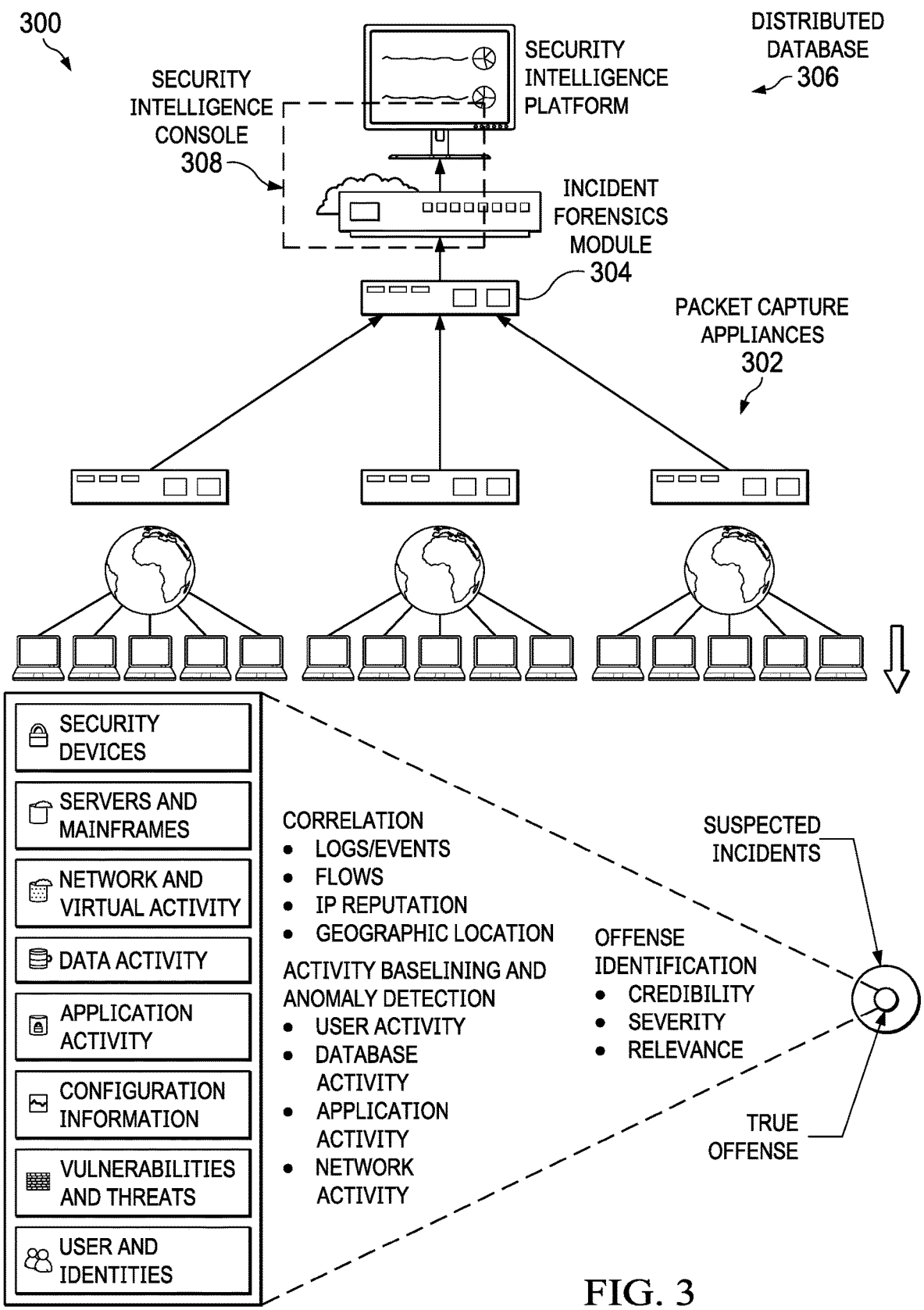
FIG. 3 illustrates a security intelligence platform in which the techniques of this disclosure may be practiced.

A known type of security intelligence platform is illustrated in FIG. 3. Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis.

A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. The bottom portion of FIG. 3 illustrates this basic workflow. Visualization and analysis tools in the platform may then be used to manually and automatically assess the results for relevance. The relevant records can be printed, exported, or submitted processing.

As noted above, the platform console provides a user interface to facilitate this workflow. Thus, for example, the platform provides a search results page as a default page on an interface display tab. Investigators use the search results to search for and access documents. The investigator can use other tools to further the investigation. One of these tools is a digital impression tool. A digital impression is a compiled set of associations and relationships that identify an identity trail. Digital impressions reconstruct network relationships to help reveal the identity of an attacking entity, how it communicates, and what it communicates with. Known entities or persons that are found in the network traffic and documents are automatically tagged. The forensics incident module 304 is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Generalizing, a digital impression reconstructs network relationships to help the investigator identify an attacking entity and other entities that it communicates with. A security intelligence platform includes a forensics incident module that is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

An appliance of this type can facilitate Security Information Event Management (SIEM). For example, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar STEM installation, the system such as shown in FIG. 3 is configured to collect event and flow data, and generate reports. As noted, a user (e.g., an SOC analyst) can investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

As further background, the following describes a technique for cognitive offense analysis.

Cognitive Offense Analysis

It is also known to process security event data in association with a cybersecurity knowledge graph ("KG"). A cybersecurity knowledge graph is derived from one or more data sources and includes a set of nodes, and a set of edges. The method preferably is automated and begins upon receipt of information from a security system (e.g., a STEM) representing an offense. Based on the offense type, context data about the offense is extracted, and an initial offense context graph is built. The initial offense context graph typically comprises a set of nodes, and a set of edges, with an edge representing a relationship between a pair of nodes in the set. At least one of the set of nodes in the offense context graph is a root node representing an offending entity that is determined as a cause of the offense. The initial offense context graph also includes one or more activity nodes connected to the root node either directly or through one or more other nodes of the set, wherein at least one activity node has associated therewith data representing an observable. The root node and its one or more activity nodes associated therewith (and the observables) represent a context for the offense. The knowledge graph and potentially other data sources may then be examined to further refine the initial offense context graph.

In particular, the knowledge graph is explored by locating the observables (identified in the initial offense graph) in the knowledge graph. Based on the located observables and their connections being associated with one or more known malicious entities as represented in the knowledge graph, one or more subgraphs of the knowledge graph are then generated. A subgraph typically has a hypothesis (about the offense) associated therewith. Using a hypothesis, the security system (or other data source) may then be queried to attempt to obtain one or more additional observables (i.e. evidence) supporting the hypothesis. Then, a refined offense context graph is created, preferably by merging the initial offense context graph, the one or more sub-graphs derived from the knowledge graph exploration, and the additional observables mined from the one or more hypotheses. The resulting refined offense context graph is then provided (e.g., to a SOC analyst) for further analysis.

An offense context graph that has been refined in this manner, namely, by incorporating one or more subgraphs derived from the knowledge graph as well as additional observables mined from examining the subgraph hypotheses, provides for a refined graph that reveals potential causal relationships more readily, or otherwise provides information that reveals which parts of the graph might best be prioritized for further analysis. The approach greatly simplifies the further analysis and corrective tasks that must then be undertaken to address the root cause of the offense.

Figure 4:
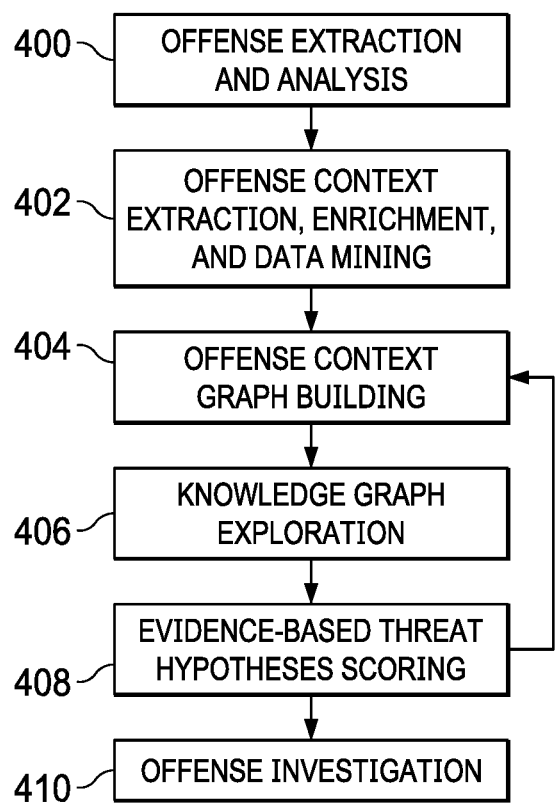
FIG. 4 depicts a high level process flow of a cognitive analysis technique.

With reference now to FIG. 4, a high level process flow of the above-described cognitive offense analysis technique is provided. The routine begins at step 400 with offense extraction and analysis. In this step, an offense is extracted from a SIEM system, such as IBM QRadar, for deep investigation. Typically, a detected offense may include many different entities, such as offense types, fired rules, user names, and involved indicators of compromise.

At step 402, the process continues with offense context extraction, enrichment and data mining. Here, offense context is extracted and enriched based on various information or factors such as, without limitation, time, an offense type, and a direction. This operation typically involves data mining around the offense to find potentially related events. The process then continues at step 404 to build an offense context graph, preferably with the offending entity as the center node and contextual information gradually connected to the center node and its children. Examples of contextual information can be represented by activity nodes in the graph. Typically, an activity comprises one or more observables, which are then connected to the respective activity, or directly to the center node.

The process then continues at step 406. In particular, at this step a knowledge graph is explored, preferably using a set of observables extracted from the offense context graph. This exploration step identifies related and relevant pieces of information or entities available from the knowledge graph. A primary goal in this operation is to find out how strongly the input observables are related to malicious entities in the knowledge graph. If the event related entities are strong malicious indicators, a hypothesis (represented by a subgraph in the knowledge graph) is generated. The process then continues at step 408. At this step, the resulting subgraph (generated in step 406) is mapped into the original offense context graph and scored. To reinforce the hypothesis (represented by the subgraph), additional evidence may be obtained (and built into the offense context graph) by querying local STEM data for the presence of activities that are related to the hypothesis that is returned by the KG exploration in step 406. Additional findings as part of the hypothesis scoring may also be used to extend the offense context graph further and/or to trigger new knowledge graph explorations. Thus, step 408 represents an evidence-based scoring of the threat hypothesis.

The process then continues at step 410 with an offense investigation. At this point, the offense hypothesis includes the original offense IOCs (indicators of compromise), knowledge graph enrichment, evidence, and scores. The extended offense context graph is then provided to the SOC analyst (user) for offense investigation. The SOC user reviews the hypothesis that has been weighted in the manner described, and can then choose the right hypothesis that explains the given offense. There may be multiple hypotheses, and these may be ranked according to the technique of this disclosure that is described below in connection with FIG. 7.

If additional or further exploration and more evidence are needed to make a decision, the SOC user can elect to nodes or edges in the offense context graph and repeat steps 406 and 408 as needed. This iteration is depicted in the drawing.

Figure 5:
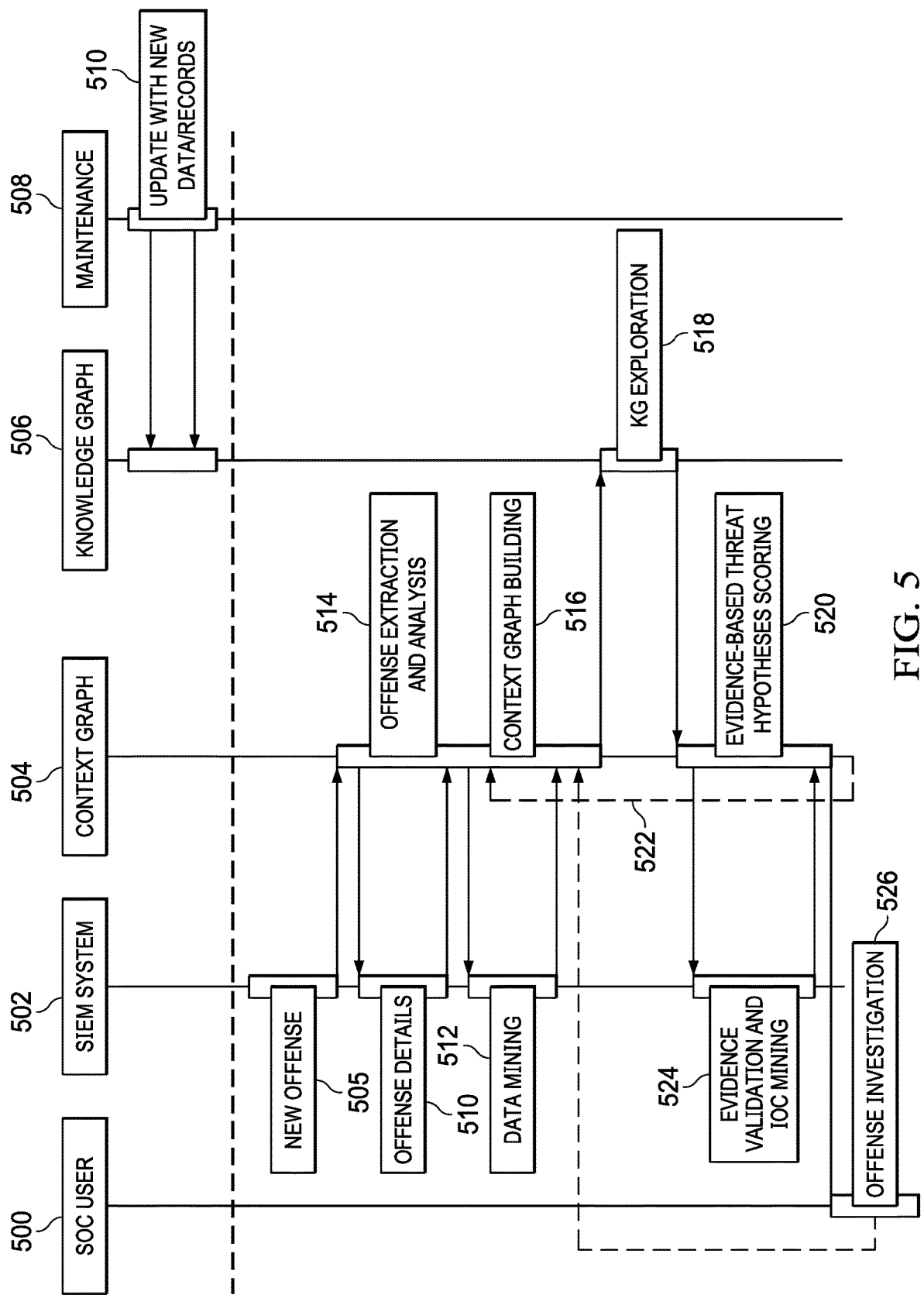
FIG. 5 depicts the cognitive analysis technique of FIG. 4 in additional detail.

FIG. 5 depicts a modeling diagram showing the various entities involved in the above-described technique and their interactions. As depicted, these entities include the SOC user 500, the SIEM system 502, the (offense) context graph 504, a knowledge graph 506, and a maintenance entity 508. Viewing the interactions from top to bottom, the knowledge graph 506 may be updated with new data/records 510 periodically; this operation is shown as an off-line operation (above the dotted line). The remainder of the figure depicts the process flow referenced above. Thus, the new offense 505 is identified by the SIEM system 502 and used together with the offense details 510 and data mining 512 to generate the context graph 504 via the offense extraction and analysis 514 and context graph building 516 operations. Once built, the knowledge graph 506 is explored 518 to identify one or more subgraphs. The evidence-based threat hypothesis scoring uses the subgraphs at operation 520, and the process may iterate (operation 522) as previously described. After evidence validation and IOC mining 524, the offense investigation 526 is then carried out, typically by the SOC user 500.

Figure 6:
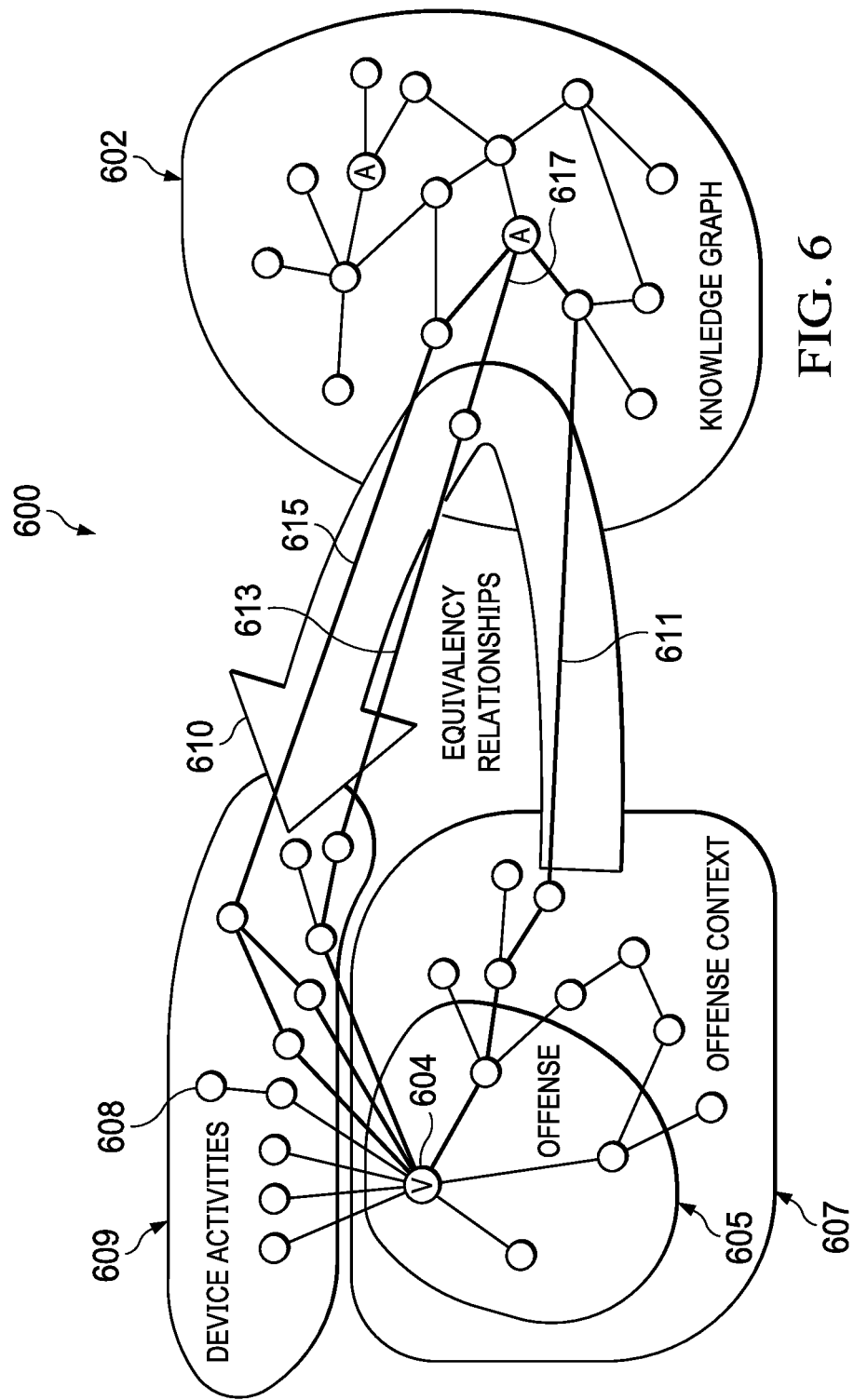
FIG. 6 depicts how an offense context graph is augmented using a security knowledge graph.

FIG. 6 depicts an offense context graph 600 augmented by the knowledge graph 602. In general, the offense context graph 600 depicts local kinetics, e.g., events and intelligence related to an offense, e.g., SIEM offense data, log events and flows, and such information preferably is augmented from the information derived from the knowledge graph 602. The knowledge graph typically is global in nature and scope, as it preferably depicts external cyber security and threat intelligence, cyber security concepts, and the like. Typically, the knowledge graph is informed by combining multiple structured and unstructured data sources. As shown, the offense context graph is centered around a root node 604 that has child nodes 606 within the "offense" 605. The "offense context" 607 includes still other nodes of relevance. There may also be a set of device activities 609 that include relevant device nodes 608. As depicted by the arrow 610, augmenting the context graph 600 using the knowledge graph 602 examines whether there is any path (such as one or more of paths 611, 613 or 615) from a node in the set of offense context nodes 607 to a node in the set of device activities 609 that passes through one or more nodes of the knowledge graph 602 (to which a threat activity is attached). In the example shown, there is one or more such paths (611, 613 and 615), and the relevant subgraph 617 in the knowledge graph thus is captured and used to augment the offense context graph.

Thus, in the approach, details of an offense are extracted from a SIEM system, such as QRadar. The details typically include offense types, rules, categories, source and destination IP addresses, and user names. For example, an offense may be a malware category offense that indicates that malicious software is detected on a machine. Accordingly, activities of the machine around the offense need to be examined to determine infection vectors and potential data leakage. Of course, the nature of the activities that will need to be investigated will depend on the nature of the offense.

Offense context related to an identified offense is then extracted and enriched depending on various factors, such as time, an offense type, and a direction. For example, if an offense type is a source IP, system and network activities of the same source IP (which may or may not be captured at other offenses) may then be collected. This collected context depicts potential casual relationships among events, and this information then provides a basis for investigation of provenance and consequences of an offense, e.g., Markov modeling to learn their dependencies. Of course, the nature of the offense context extraction and enrichment also depends on the nature of the offense.

From the contextual data extracted (as described above), an initial offense "context graph" 600 in FIG. 6 is built, preferably depending on offense types, such that a main offense source becomes a root 604 of an offense context graph, and offense details are then linked together around the root node. As noted above, the initial context graph preferably is then enriched and, in particular, by correlating local context, to further identify potential causal relationships among events. This helps analysts perform deep, more fine-grained investigation of provenance and consequences of the offense.

Provenance context preferably is extracted by identifying other offenses wherein the offense source is a target, e.g., an exploit target. Similarly, consequence context is extracted, preferably by finding other offenses wherein the offense source also is a source, e.g., a stepping stone. Similarly, consequence context is extracted by finding other offenses. Thus, this graph typically contains the offending entity (e.g., computer system, user, etc.) as the center (root) node of the graph, and contextual information is gradually connected to the node and its children. The result is the offense context 607 in FIG. 6. Examples of contextual information will depend on the nature of the offense; such information can be represented by activity nodes that include, without limitation, network activity, user activity, system activity, application activity, and so forth. Preferably, an activity comprises one or more observables, which are then connected to the respective activity nodes or directly to the center node. Further, the context graph can be extended with additional nodes representing information that does not directly relate to the original offense. For example, and by means of data mining (e.g., behavior-based anomaly detection, sequence mining, rule-based data extraction, and the like) of security-related events in temporal vicinity to the offense, additional activities of interest can be extracted and added to the context graph. This operation is represented in the graph by device activities 606.

Thus, in the cognitive analytics approach as outlined above, details of an offense are extracted from a SIEM system. The details include (but are not limited to) offense types, rules, categories, source and destination IPs, and user names. An initial offense context graph is built depending on offense types, such that the main offense source becomes the root of an offense context graph and offense details are linked together around the root node. The initial context graph is then enriched by correlating local context to further identify potential casual relationships among events, which helps analysts perform deep investigation of provenance and consequences of the offense. Provenance context is extracted by identifying other offenses where the offense source is a target, e.g., an exploit target. Similarly, consequence context is extracted by finding other offenses where the offense target is a source, e.g., a stepping stone. The enriched (and potentially dense) offense context graph is then pruned to highlight critical offense context for the SOC analyst's benefit. Typically, pruning is applied based on several metrics, such as weight, relevance, and time. For example, it may be desirable to assign weight to each event detail based on offense rules and categories to thereby indicate key features contributing to an offense.

Once the initial offense context graph is built, preferably that context graph is further enriched, validated and/or augmented based on information derived from a cybersecurity knowledge graph (KG) 602, which preferably is a source of domain knowledge. The knowledge graph, like the initial offense context graph, comprises nodes and edges. The cybersecurity knowledge graph can be constructed in several ways. In one embodiment, one or more domain experts build a KG manually. In another embodiment, a KG 602 is built automatically or semi-automatically, e.g., from structured and unstructured data sources. As noted above, the context extraction and analysis processes provide a list of observables related to the given offense. According to this operation, the observables preferably are then enriched using the in-depth domain knowledge in the KG. This enrichment (or knowledge graph exploration) is now described.

In particular, this knowledge graph (KG) enrichment operation can be done in several different ways. In one approach, enrichment involves building sub-graphs related to the observables. To this end, the system locates the observables in the KG and discovers the connections among them. This discovery may yield one or more subgraphs (such as 617 in FIG. 6) showing the relationships of the given observables with other related security objects such as observables and threats. These subgraphs can provide a broader view on the given offense.

In another enrichment scenario, a SOC analyst can perform the query knowledge graph (KG) exploration step receives a set of observables, such as IP, URL, and files hashes, extracted from the SIEM offense. This exploration step seeks to identify all related and relevant pieces of information or entities available in the knowledge graph. The main goal is to find out how strongly the input observables are related to malicious entities in the knowledge graph. Some of the related entities can be strong malicious indicators, and thus a hypothesis about the offense can be generated. The related malicious entities might be strongly related among themselves, which also creates a hypothesis. Generalizing, an output of this step is a set of one or more hypotheses, which are consumed during the evidence-based threat hypothesis scoring operation where they are evaluated against local SIEM data. Preferably, and as noted above, the extraction of related entities is performed by traversing the knowledge graph, preferably starting from the input observables and extracting the subgraph. In general, unconstrained subgraph extraction may result in a very large and noise graph. Preferably, one or more traversal algorithms that focus on finding different types of related information by exploring the graph and pruning less relevant entities from the result may be deployed. One or more of these pruning algorithms may be run serially, in parallel, or otherwise. In addition, where possible coefficients of the graph entities are precomputed to enhance the efficiency of the graph traversal.

The following describes additional details of the evidence-based threat hypothesis scoring. Preferably, the knowledge graph exploration step returns a subgraph of observables, along with one or more annotations associated with the hypotheses. This subgraph preferably is then mapped into the original context graph. To reinforce the hypotheses, it may be desirable to build further relevant evidence, e.g., by querying local SIEM data for the presence of activities that are related to the hypotheses returned by the knowledge graph exploration. These activities may not have been flagged before by a simple rule-based offense monitor. This operation thus builds a merged graph that includes input from three sources, the original context graph, the knowledge graph exploration subgraph, and the additional observables queried for building the evidence for the hypotheses.

As also described, the final operation typically is offense investigation. Based on the prior operations described, the offense hypotheses now include the original offense IOCs, knowledge graph enrichment and supporting evidences, and their scores. This extended graph then is provided to an SOC analyst for an offense investigation. The SOC analyst reviews the weighted hypotheses and chooses the right hypothesis that explains the given offense. The selection itself may be automated, e.g., via machine learning. If further exploration and more evidence are needed to make a decision, the SOC can choose the nodes and/or edges of interest in the hypothesis graphs, and then repeat the above-described steps of knowledge graph exploration and evidence-based threat hypotheses scoring. During the hypothesis review process, the SOC may learn new facts and insights about the offense and, thus, add additional queries (e.g. observables or relationship) in a next iteration. The SOC analyst thus can use this iterative knowledge enrichment, evidence generation and hypothesis scoring to gain a deep understanding of the offense and actionable insights that may then be acted upon.

Thus, the basic notion of this approach is to use an autonomic mechanism to extract what is known about an offense (or attack), reason about the offense based on generalized knowledge (as represented by the knowledge graph), and thereby arrive at a most probable diagnosis about the offense and how to address it.

It may be desirable to explore the knowledge graph, e.g., to reduce its size to a more manageable level. To this end, a signal flow analysis-based exploration of security knowledge represented in the graph structure may be implemented. In this approach, "conductance" values are associated to each of a set of edges. Each node has an associated "toxicity" value representing a degree of maliciousness associated with the node. The conductance value associated with an edge is a function of at least the toxicity values of the nodes to which the edge is incident. A signal flow analysis may be conducted with respect to an input node representing an observable associated with an offense. The flow analysis seeks to identify a subset of the nodes that, based on their conductance values, are reached by flow of a signal representing a threat, wherein signal flow over a path in the graph continues until a signal threshold is met. Based on the analysis, nodes within the subset are designated as hypothesis nodes for further examination. Entities that are not in the path from an input node to the hypothesis nodes preferably are pruned.

Figure 7:
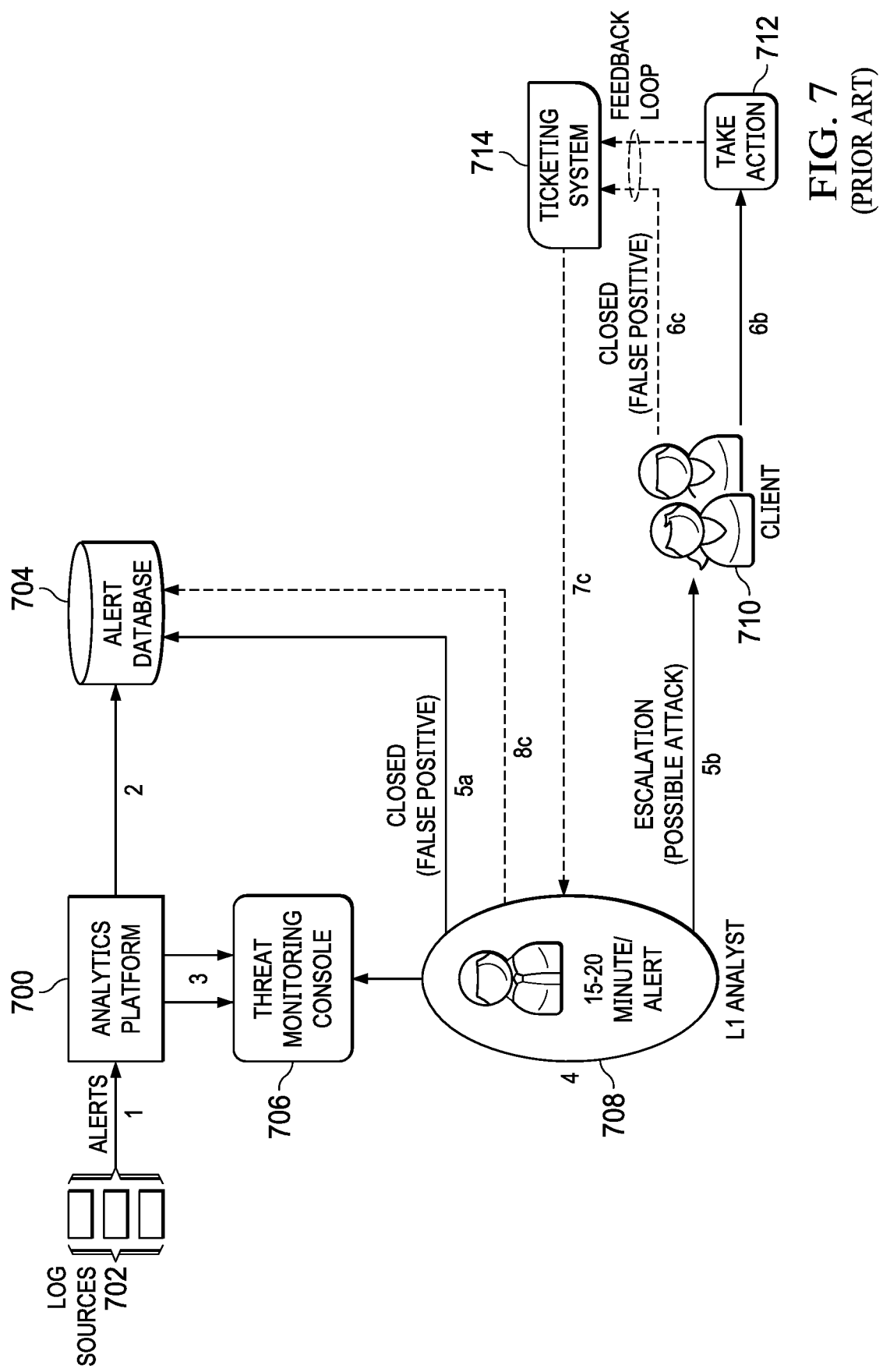
FIG. 7 depicts a Level 1 security threat monitoring operation in a data center operating environment.

By way of additional background, FIG. 7 depicts a Security Operation Center (SOC) that provides Level 1 security threat monitoring using an analytics platform 700. The platform 700 receives alerts (at step (1)) from a variety of log sources 702, such as firewalls, intrusion detection and prevention systems, antivirus systems, web proxies, and other systems and network devices. At step (2), the alerts are stored in an alert database 704. At step (3), the alerts are provided to a threat monitoring console 706 that is manned by a security analyst 708. As is well-known, a SOC typically is manned by different levels of security analysts. A Level 1 (L1) analyst 708 is responsible for monitoring reported security events, and for closing or escalating those events according to SOC rules, policies and procedures. The security analyst 708 typically interacts with a client 710, which is the enterprise entity having an application that is being monitored for security threats. Although not shown, typically the SOC has one or more additional levels of security analysts, such Level 2 (L2) and Level 3 (L3) analysts. Typically, L2 security analysts handle escalations from L1 analysts and perform other administration and management functions, such as monitoring the performance of the L1 analysts to ensure that security events are handled timely, mentoring, and the like. Level 3 analysts handle further escalations (from L2 analysts), and provide additional higher-level administration and management functions in the SOC. Of course, the number of levels and the various tasks associated with each level may be varied and implementation-specific.

As depicted, the L1 analyst makes a finding regarding an alert, typically with a goal of making this finding within about 15-20 minutes after receiving the alert. Typically, the finding closes the alert (step 5(a)) as a false positive, or escalation the alert (step 5(b)) as a possible attack. The false positive finding is stored in the alert database 704. The attack finding typically is reported to the client 710 whose application is affected. Depending on the implementation (e.g., the SOC policy, the client procedure, etc.), some remediation or other action (step 6(b)) is taken; alternatively, the client 710 may indicate that indeed the alert is a false positive and thus should be closed (step 6(c)). The responsive action 712 may be carried out in an automated manner (e.g., programmatically), manually, or by a combination of automation and manual operations. The action may be carried out by SOC personnel, by the client, or by a combination of SOC personnel and the client. As also depicted, information regarding the response to the alert is also provided to a ticketing system 714, and such information may then be reported back to the security analyst (step 7(c)). The security analyst may then update the alert database (at step 8(c)) with the information about how the alert was handled (or otherwise closed). Thus, the alert and its associated handling information is stored in the alert database 704 and available as a data source going forward.

A cognitive security analytics platform and the threat intelligence services described above may be implemented in a network-accessible cloud computing infrastructure that offers cyber security applications to a community of users (typically enterprise customers). This infrastructure preferably hosts various machine learning (ML) and Artificial Intelligence (AI)-based solutions to help users identify threats or risks, and improve the efficacy and efficiency of threat detection and response. Using tools provided by the platform, users can design and deploy customized and comprehensive solutions to address security outcomes, such as SOC Operations workflows, digital trust, or the like. The platform extends the capabilities of enterprise-based security products and, in particular, by providing robust integration capabilities to connect data, applications and tools provided by multiple vendor sources.

Cyber Threat Intelligence Services with Affectedness Scoring

With the above as background, the technique of this disclosure are now described. Generally, the technique provides for an affectedness scoring method and system by which a score (sometimes referred to herein as a "priority") is associated with a particular threat identified by the cyber security analytics platform/threat intelligence service.

A network-accessible cyber-threat security analytics service is configured to characterize and respond to cyber threat assessments, such as an advisory that includes threat indicators (e.g., IOCs). An advisory of this type typically is a text description of a cyber-attack, and typically it includes an initial severity indicia (score) assigned as a result of a security analysis. Enterprises register with the service by providing identifying information, such as industry, geographies, and the like. One or more (and preferably several) security knowledge bases are programmatically coupled to the service. The knowledge bases vary but typically include: a managed security service (sometimes referred to as an "MSS") that collects, aggregates and anonymizes security events from multiple entities, a cyber threat intelligence service (sometimes referred to as an "CTI") that generates and provides knowledge graph-based per threat indicator risk indicia, and a federated search engine (sometimes referred to as an "UDS") that searches across one or more enterprise-connected SIEM or non-SIEM data sources. The above-identified acronyms are not intended to be limiting. The number and type of the security knowledge bases may vary, and these knowledge sources may be static or changing, internally-hosted or externally-accessible, etc.

In response to receipt of the advisory, and preferably for each threat indicator therein, a query is sent to each of a set of one or more security knowledge bases, and at least some of the queries are scoped by the enterprise industry/geo information specified. Responses to the queries are collected. A response provides an indication whether the threat indicator identified in the query has been sighted in data sources comprising the security knowledge base. The system then adjusts the initial severity score to reflect the indications (namely, the sightings) returned from querying the security knowledge bases, as well as relative weightings assigned to those knowledge sources to thereby compute a priority (for taking action). An action is then taken based on the priority. Typically, the action is one of: adjusting an investigative workflow, issuing a notification or alert, updating a security analysis visualization, and providing a command to execute an external computing action.

Figure 8:
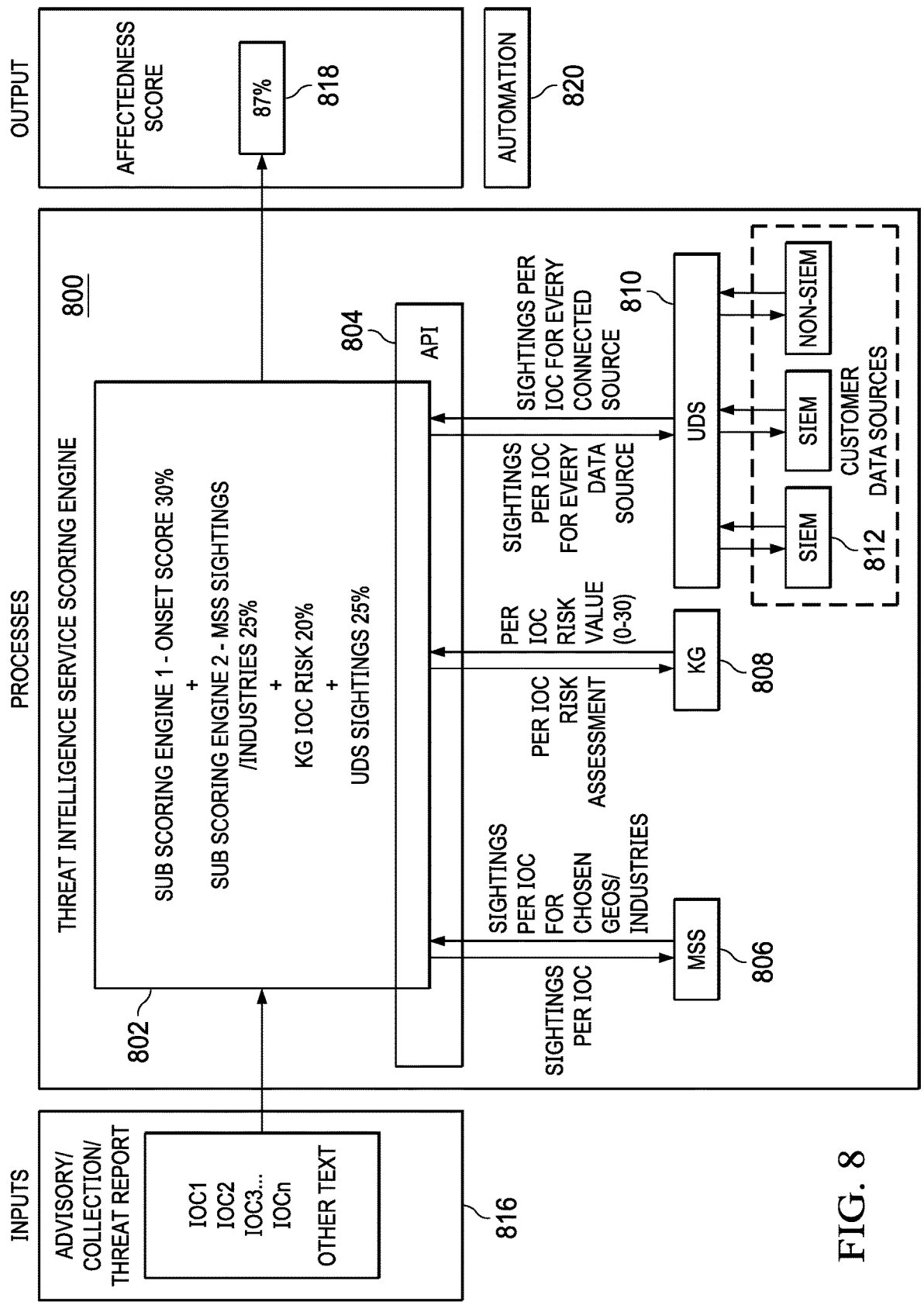
FIG. 8 depicts an affectedness scoring mechanism according to an embodiment of this disclosure.

FIG. 8 depicts one representative implementation, which is not intended to be limiting. As depicted, a cyber threat intelligence service 800 is augmented to include an affectedness scoring engine 802 that performs the scoring technique of this disclosure. The threat intelligence service typically is hosted in a cloud compute environment and, as such, it is accessible to one or more enterprises (each an enterprise entity) and their respective authorized users. The cloud compute environment may be public or private, or a hybrid cloud. The threat intelligence service 800 supports one or more cyber security applications, interfaces, databases and the like, all in a known manner. A known operating environment of this type is augmented according to this disclosure to include the affectedness scoring engine functionality. In one embodiment, the affectedness scoring engine is implemented in software, as a set of computer program instructions executed in one or more processors. A typical implementation was described above with respect to FIGS. 2, 3 and 7.

The analytics service provides a registration component, which typically is implemented as a web-based configurator. An enterprise registers for the service by entering given data into the system to comprise an enterprise profile. Typically, an enterprise profile is a data set that includes a set of characteristics that define both an "industry" into which the enterprise fits (or otherwise has an interest in with respect to potentially-relevant or impactful cyber-activity), as well as one or more geographies of interest (e.g., countries, regions, etc.). Using a web-based configurator, the enterprise enters its relevant industry/geo information of interest in the enterprise profile, as well as other data required by the service (e.g., contact information, billing data, etc.). As will be described below, preferably this industry/geo data preferably is used to constrain the operation of the scoring engine so as to provide more targeted and useful knowledge to the enterprise, in the manner described below. In an alternative embodiment, other enterprise-related or enterprise-specified data may be used (in addition to, or in lieu of) the industry/geo data to filter the data used by the system. Also, the enterprise profile data may be received by the system in other ways, e.g., automatically, programmatically, or the like.

As also depicted in FIG. 8, typically the affectedness scoring engine interacts with a set of security knowledge bases. A security knowledge base may be configured as (or to leverage) a security threat intelligence service in its own right, but this is not required. As depicted, typically there are several different types of knowledge bases, and each such knowledge base typically is accessible programmatically via an application programming interface (API) or similar service 804. The particular interface details are not a requirement, and known request-response protocols may be used for this purpose. The APIs may be public or private. In a representative embodiment, the knowledge bases include a managed security service (MSS) 806, which is a known cyber security service that collects, aggregates and anonymizes security events from multiple entities, typically large number of enterprise customers. A representative commercial service of this type is IBM® Managed Security Services. The MSS can be queried via its API and returns sightings data gathered from a large number (e.g., thousands, millions or even billions) of logs collected (e.g., daily) for the customer IT infrastructure(s) that are being monitored by that service. Typically, the MSS is configured to aggregate data it collects and to store the aggregated data, typically in an anonymized manner. Thus, a query to the MSS returns an indication of whether the indicator that is the subject of the query has been sighted in the MSS data. The information returned, however, is anonymized and based on the aggregate data, thereby preserving confidentiality and privacy of the source data.

In addition to the MSS, another knowledge base that preferably is used by the affectedness scoring engine is a knowledge graph (KG)-based IOC risk assessment component 808, which may comprise part of the CTI threat intelligence service itself (e.g., as a back-end service), provided from a third party (external) vendor, or otherwise. The component is configured to operate in the manner described above with respect to FIGS. 4-6 and, in particular, to aggregate different internal and external threat intelligence data sources, normalize them into a graph database data model, and then expose different API endpoints with enriched intelligence. A query to this component typically provides a per-IOC risk score, typically with a toxicity value. A representative commercial service of this type is IBM® X-Force Exchange threat intelligence sharing platform.

Preferably, still another knowledge base accessible to the affectedness scoring engine is a User Data Source (UDS) knowledge base 810, which in the general case is a federated search engine that interacts with one or more enterprise data sources 812. An enterprise data source 812 typically is a SIEM, or non-SIEM data source A representative SIEM data source is IBM® QRadar® platform, which was described above in connection with FIG. 3. Other data sources include, without limitation, commercial offerings such as IBM® BigFix, and others. As its API, the federated search engine provides a structured query language for use by other services (in this case the affectedness scoring engine) to ask for the presence and frequency of various IOCs in the customer data sources. Indications of IOC sightings are then returned to the engine. As used herein, the notion of a "sighting" typically refers to an explicit finding or an inference that it is reached after an indicator of compromise (IOC) has been found (actually seen) in a data source in the customer network. Thus, a sighting indicates a positive match (or at the very least some positive evidence) that a given indicator is present (i.e., has been seen). In this regard, a sighting is an indication of such presence in the data source. To give a simple example, if the IOC is an IP address, and the data source is an enterprise firewall that has recorded that IP address, the query to that data source returns a positive indication, and that indication may also include whatever information has been recorded by the data source (e.g., the name and make of the firewall, a date when the IP address was flagged by the firewall, a location associated with the IP address, or other information associated with the firewall event). Conversely, if the query to the data source is negative, e.g., because the IP address is not present there, no sighting is recorded with respect to the query.

As also depicted, the affectedness scoring engine may query other information sources, such as other knowledge bases, threat assessment services, and the like.

It is not required that the affectedness scoring engine be used with all of the knowledge base types/services depicted in FIG. 8, although typically improved results are provided as the number and nature of the IOC sightings (returned from these data sources) is increased. Minimally, preferably at least one knowledge base is accessed.

As also depicted in FIG. 8, preferably, the affectedness scoring engine receives an input 816. Typically, the input is a text-based description of a cyber-attack or, more generally, a cyber-threat. A representative input is a threat advisory. Conventionally, an advisory is synonymous with a threat report (or threat collection) and that contains text descriptions of a cyber-attack, along with a set of one or more Indicators of Compromise (IOC). A typical advisory of this type is a crafted write-up about the threat, mitigation recommendations for the customers, context about the attack, and much more, including as noted the IOCs that provide evidence of the threat in question. An IOC typically is one or more of: an IP address, a domain, a hash, a URL, a memory fragment, a registry key, an email address, and the like. More generally, the input to the affectedness scoring engine is a description that includes information on types of systems, software affected, severity of the threats to respective systems, as well as indicia whether a system or software is affected by the respective cyber-threat and, if so, to what extent. In particular, advisories typically have embedded in them a score, which is sometimes referred to herein as an on-set score, of how severe the threat is considered at the time of publication of the report. The on-set score typically is added in by security analysts, threat hunters, or the like, during the process described above with respect to FIG. 7.

In this regard, it is known that an indicator of compromise can be attributed a risk or toxicity at any point in time, and by many different techniques. Often, an IOC that is identified in an advisory is one that has been seen for the first time; as such, typically the advisory includes an "initial severity indicia" that is associated with the IOC. Typically, the advisory includes initial severity indicia that is specified as a result of a security analysis. Examples of initial severity indicia are, without limitation: one or more IP addresses that are believed to be associated with an active spear phishing campaign, one or more URLs of servers that are being used as command and control (C&C) distribution centers for a new variant of malware that is destructive, file hash matches that correspond to, say, a seemingly inoffensive video that is being shared within the company but that is infected with a computer virus, probing of a known vulnerability into a customer's network, as hackers are doing reconnaissance to determine if computers or servers have been patched, an excessively high number of requests to the servers of a company, indicative of a distributed denial of service attack, attempting to bring services down, and the like. These are merely representative examples. Typically, and when a previously-seen IOC is detected in the customer environment again, it may then be assigned a "high severity" indicia, which indicates that the IOC represents a very high risk, thereby typically warranting closer research or examination. Indeed, in the usual case the detection of an IOC with high severity is how many of the investigations in SOCs start, namely, by the detection of an indicator that has an established bad reputation. While dealing with an individual indicator of this type often is manageable, the analysis task is much more complex when the security analyst has to analyze many indicators (and their current risk severity) especially across many different customer environments, and then try to evaluate their combined impact, perhaps relative to the impact of other occurrences going on in the same environment. The technique of this disclosure addresses and solves this problem. In particular, the affectedness scoring engine extracts the IOCs present in the collection, along with the on-set score. This operation may be carried using a Natural Language Processing (NLP) engine, or other such processes, tools and systems for interpreting unstructured information, and such processes, tools and systems may execute locally or remotely. Parsing of the input document may be carried out as a pre-processing operation or as such documents are received by the engine.

As will be described, the affectedness scoring engine extracts the on-set score for the cyber threat, queries the knowledge base(s) for IOC sightings, and adjusts the on-set score based at least in part on the IOC sighting data returned from the programmatic queries. Preferably, and according to an aspect of this disclosure, preferably certain of those knowledge base queries are filtered by the industry/geo information for the enterprise (as specified in the enterprise profile) on whose behalf the query operation is being done. Typically, the MSS and UDS queries are based on the industry/geo filtering. Thus, for example, for a particular cyber-threat having $IOC_1$, $IOC_2$, and so on, the affectedness scoring engine will iterate through the IOCs (starting with the first one, and continuing until done), and query the MSS (or the UDS) to determine whether, for the particular industry, and for the particular geo, whether the IOC in question has been sighted (by the MSS or UDS, as the case may be). A response to the query is returned via the API, and the response indicates the sighting of the IOC, for the particular industry(s) and geo(s) specified in the enterprise profile. Although this processing is described for simplicity as occurring iteratively (i.e., IOC-by-IOC), the querying may also be carried out on a batched basis such that all of the queries to the MSS (or other knowledge base, as the case may be) happen together (collectively), and all responses are returned together (collectively, in the aggregate, or otherwise as specified by the API). Queries to the one or more other knowledge bases happen in a similar manner. Further, query sets may proceed from one knowledge base to the next, or the queries (to each connected knowledge base) may be carried concurrently.

The knowledge bases may be located together with the affectedness scoring engine, or they may be located and accessed remotely.

A query seeks to determine whether the IOC (or, more generally, the threat indicator) has been seen in the knowledge base and, if so, to what extent. The sightings data thus provides intelligence about whether the on-set score as specified in the threat document is accurate with respect to the unique characteristics (e.g., industry, geo, or other such identifying information) about the enterprise. In the usual case, the threat document (advisory) includes the on-set score, which (as a consequence of how it is created) is the same for all enterprises. Using the technique of this disclosure, the affectedness scoring engine in effect customizes that on-set score for each enterprise, as the query mechanism queries enterprise-specific data sources, as well as applying in the industry and/or geo-constraints. The technique thus provides much more fine-grained (enterprise-specific) scoring as compared to the generic on-set score.

As depicted in FIG. 8, and as a result of executing the affectedness scoring engine, the TIS outputs an affectedness score 818 that, as noted above, is customized to the enterprise. In one embodiment, the affectedness score 818 is expressed as a percentage, e.g., on a scale of 0-100%. The higher this score, the greater the priority that the threat needs to be addressed (by the enterprise), especially if the score is significantly higher than the on-set score identified from the advisory. Preferably, the score 818 (or, more specifically, its value) is then used to control or drive other automation 820, which is used to take a given action including, without limitation, adjusting an investigative (e.g., SOC analyst) workflow, issuing a notification or alert, updating a security analysis visualization, and providing a command to execute an external computing action. Thus, for example, if the score is indicative of a high priority threat, the automation 820 is triggered to take a first action (e.g., issue a control command to perform a mitigation, such a blocking a computing operation, sandboxing a process, etc.); if, however, the second indicates only a medium priority threat, the automation 820 is triggered to take a second action (e.g., issue an alert); a still lower priority threat may trigger the automation 818 to take a third action (e.g., re-configure a SOC workflow), and so forth. Of course, these are just representative examples. Preferably, the affectedness score is the outcome of the scoring engine subsystem that operates within TIS, and preferably the score is delivered along with the threat data that is evaluated as the basis of calculation of the affectedness score. As described above, the affectedness score can be used to enhance the work of humans (optimize and focus investigations in a SOC environment) or by other machines (alerting, rework investigation flows, etc.).

Summarizing, the following describes a preferred operation of the TIS affectedness scoring engine. For every IOC found in the input advisories/collections/report, the engine preferably submits a query to each connected knowledge-based/system. In particular, a query is submitted to MSS to get global sightings information for the geographies and industries that the customer selected in the inputs. A query is submitted to UDS for sightings data (affected or not) for every IOC extracted from the advisories or threat collections in the specific customer data sources that are connected to UDS. The UDS queries may be industry/geo-constrained, e.g. where the enterprise operates across many different industries and/or geographic areas. The sightings information tells the scoring engine whether an IOC was found, and if so, how many times it was seen. A query is submitted to the KG-based engine (e.g., X-Force Exchange) to get a per-IOC evaluation of their risk at the time. This latter operation enables the system to obtain a ranking of every IOC and, in particular, its maliciousness level (sometimes referred to as toxicity). Based on the toxicity score returned the indicator (IOC) is either categorized as malicious or benign using a Boolean parameter. The notion of assigning IOCs a toxicity score can be applied to any external vendor that provides risk assessment; thus, the IOCs can be evaluated against an "N" number of external and internal threat vendors, with the resulting toxicity values considered and applied to the scoring. Assessments may not be standardized (meaning that vendor X and vendor Y think differently about an IOC at any given time); however, these differences can be accounted for in the affectedness score.

Figure 9:
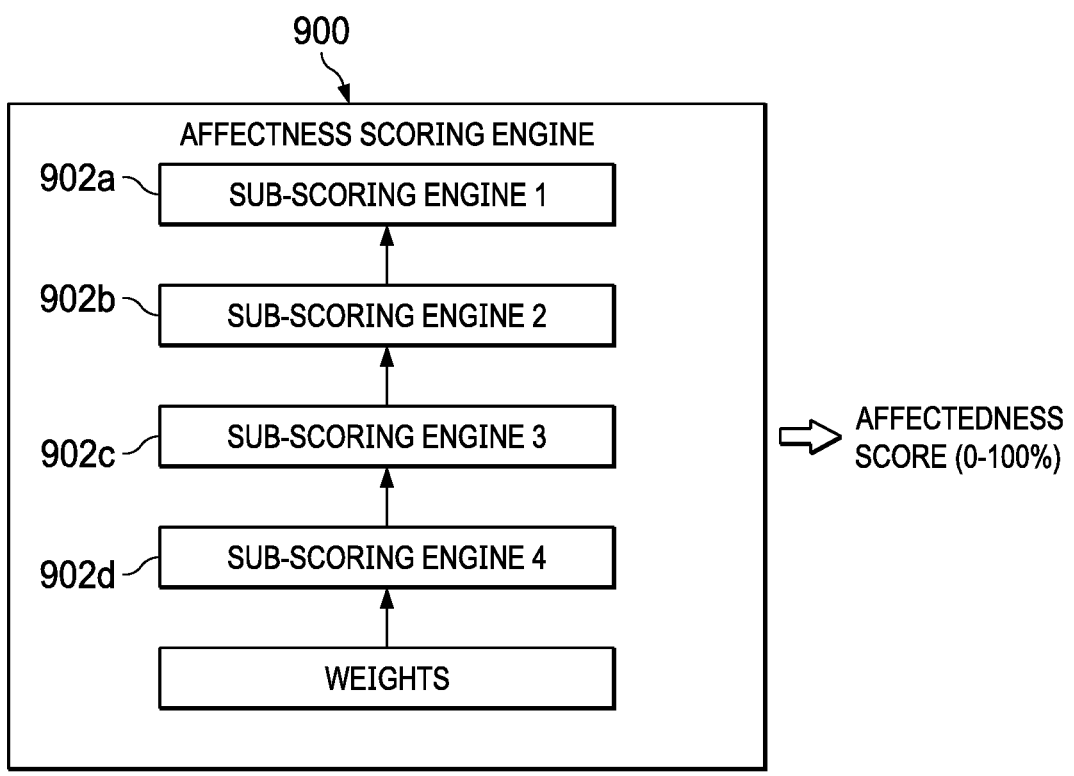
FIG. 9 depicts a representative scoring engine.

As noted above, it is not required that each knowledge base be consulted during execution of the affectedness engine. Any one item or more from the inputs as described may be missing. Thus, and generalizing, preferably the affectedness score is calculated with the knowledge available to the engine at the relevant time (of the computation). Thereafter, preferably the score is adjusted dynamically as information becomes available or updated. Thus, in the usual case the query process as described above may be repeated periodically (e.g., daily) and may continue continuously, with additional/different responses being returned from the knowledge bases. These different responses typically impact the affectedness score, and this it is anticipated that the score will vary dynamically as well. FIG. 9 is a block diagram depicting a preferred operation of the affectedness scoring engine. As shown, preferably the engine 900 computes the affectedness score from a set of sub-scoring modules/functions (or engines) 902. As noted above, the inputs to the scoring engine typically are the customer's geographical locations and industries, a data lake of logs from an MSS customer base, UDS scans of customer devices, KG-based threat intelligence, and indicators of compromise. In addition, and according to another aspect of this disclosure, preferably the sub-scoring modules/functions are associated with a set of heuristic weights (weightings) that are system-supplied, enterprise-adjustable, or some combination thereof. A default set of heuristic weights thus may be as follows: {30|25|10|35}, which in this example corresponds to 30%—impact of the on-set score; 25%—impact of MSS sightings for chosen industries and geos; 10%—KG-based IOC risk assessment; and 35% —impact of UDS sightings for customer-connected data sources. This weighting is not intended to be limiting.

In this example scenario, which is not intended to be limiting, the sub-score engine 902a provides a pre-UDS impact score (i.e., the customer has not connected data sources. This sub-scoring engine thus produces relevance for the customer based on industry/geo match for every IOC in the global sighting data source (MSS), combined with any existing IOC toxicity scores. For example, if a customer operates in two locations, e.g., Canada and the United States, and the threat/IOC has been seen in same locations, this sub-score will be 1. Continuing with this example scenarios, a second sub-score engine 902b providers a post-UDS impact score (i.e., the customer has connected data sources). In this module, preferably every IOC observed for the industries and geos that the customer selected is looked up against the data assets (MSS, anonymized UDS queries and responses (e.g., QROC), etc., queries against each customer-connected data source, and the like. A third sub-scoring engine 902c provides a threat hunter specialist severity. Preferably, this is a set score, calculated when the threat was first identified and researched. In a preferred embodiment, this corresponds to a result of normalizing the on-set score in the initial advisory. Often, this is a human-generated score, as it encapsulates the best reasoning of threat hunters responsible for creating the content for the threats that customers are being presented. A fourth scoring engine 902d provides an outlier score (e.g., an indicator of prevalence, thereby flagging high volume IOCs). The outlier score may be based on a learned distribution of geography, industry or another SIEM-based category, Generalizing, preferably each of the above sub-scoring modules, and there may be more such modules, have assigned weights. The weights (and, more generally, the notion of assigning and applying weights to the sub-scores) enable the affectedness score to be dynamic, customizable, graphically-represented, and scalable. Thus, e.g., when any one or more of the knowledge base components are missing, associated sub-scoring modules are activated or de-activated on-the-fly by just setting the weights appropriately (e.g., set to 0 for de-activation). By using weightings, an enterprise (or the service provider itself) can decide which knowledge base (e.g., UDS data) is more interesting to them and thereby allocate higher importance to that data vis-à-vis the other sub-scoring engines. Improved visualizations are enabled by providing the affectedness score to display interactive components that show the score is composed and how the customer's information plays a part in that scoring. Scalability is enabled by the weighting, as a customer can extend the framework by adding its own sub-scoring engine that provides scores for IOCs based on any custom logic. Moreover, the weights can be dynamically updated, e.g., based on collective intelligence, by analyzing how multiple customers use theirs weights, thereby indicating knowledge base preferences.

Further, the weights may be adjusted (manually, automatically or programmatically) based on feedback. For example, the system can compare the final threat closure report generated after human investigation and adapt the weightings appropriately. For example, if an investigation concludes that a threat was high severity but the scoring engine only generated a score of 70% relevance, the system can analyze which parts of the scoring engine contributed to the low score. In this example, that score may have arisen because the analysts used more or different sources than scoring engine had access to (e.g., such as external reports that gave different representation of indicator toxicity), or because analyst had access to different data sources. The system collects this data and thereafter makes smarter suggestions when customers interact with a threat.

Preferably, the scoring result (namely, the result of executing the affectedness scoring engine for a computing cycle) is displayed when a user is viewing the current list of advisories (threat reports) provided by the system.

Without intending to be limiting, the approach herein may be used in association with cognitive offense analytical techniques such as described above with respect to FIGS. 4-6.

This subject matter may be implemented as-a-service. The subject matter may be implemented within or in association with a data center that provides cloud-based computing, data storage or related services. The data mining functionality may be provided as a standalone function, or it may leverage functionality from other products and services including, without limitation, a Question-Answer based Natural Language Processing (NLP) system, products, device, program or process.

In a typical use case, a SIEM or other security system has associated therewith an interface that can be used to render the rank-ordering of hypotheses-related information visually, to search and retrieve relevant information from alert database, and to perform other known input and output functions with respect thereto.

As noted above, the approach herein is designed to be implemented in an automated manner within or in association with a security system, such as a SIEM.

The alert information itself may be processed using a question and answer (Q&A) system, such as a natural language processing (NLP)-based artificial intelligence (AI) learning machine. A machine of this type may combine natural language processing, machine learning, and hypothesis generation and evaluation; it receives queries and provides direct, confidence-based responses to those queries. A Q&A solution such as IBM Watson may be cloud-based, with the Q&A function delivered "as-a-service" (SaaS) that receives NLP-based queries and returns appropriate answers. In an alternative embodiment, the Q&A system may be implemented using IBM LanguageWare, a natural language processing technology that allows applications to process natural language text. LanguageWare comprises a set of Java libraries that provide various NLP functions such as language identification, text segmentation and tokenization, normalization, entity and relationship extraction, and semantic analysis.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the threat disposition and modeling techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., automation-based cyber security analytics platforms, threat intelligence services, security incident and event management (SIEM) systems, other security systems.

Having described the invention, what we claim is as follows:

1. A method of characterizing and responding to a cyber threat assessment, the cyber threat assessment having an initial severity indicia and comprising a set of one or more threat indicators, comprising:
   associating a relative weighting to each security knowledge base in a set of security knowledge bases;
   receiving a data set identifying a set of characteristics associated with an enterprise;
   for at least one threat indicator in the set, initiating a query programmatically to each of the security knowledge bases, wherein the query to at least one of the security knowledge bases is scoped by information in the data set;
   receiving responses to the queries programmatically, wherein a response provides an indication that the threat indicator identified in the query has been seen in data sources comprising the security knowledge base;
   adjusting the initial severity indicia based on the relative weighting and the indications returned from querying the security knowledge bases to compute and output a priority; and
   taking an action based on the priority.

2. The method as described in claim 1 wherein the action is one of: adjusting an investigative workflow, issuing a notification or alert, updating a security analysis visualization, and providing a command to execute an external computing action.

3. The method as described in claim 1 wherein the set of characteristics are one of: one or more industries associated with the enterprise, and one or more geographic areas associated with activities of the enterprise.

4. The method as described in claim 1 wherein the security knowledge bases comprise one of: a managed security service that collects, aggregates and anonymizes security events from multiple entities; a cyber threat intelligence service that generates and provides knowledge graph-based per threat indicator risk indicia, and a federated search engine that searches across one or more enterprise-connected SIEM or non-SIEM data sources.

5. The method as described in claim 1 wherein the cyber threat assessment is an advisory having a text description of a cyber-attack, a threat indicator in the advisory is an Indicator of Compromise (IOC), and the initial severity indicia provided in the advisory is specified as a result of a security analysis.

6. The method as described in claim 1 further including receiving additional responses from the set of one or more knowledge bases and updating the priority based at least in part of indications identified in the additional responses.

7. The method as described in claim 1 wherein adjusting the initial severity indicia based on the indications returned from querying the security knowledge bases comprises:
   normalizing the initial severity indicia to generate a sub-score;
   generating a sub-score for a particular security knowledge base by multiplying a weighting for the particular security knowledge base together with a value associated with a number of indications for that particular security knowledge base; and
   computing the priority based on the sub-scores.

8. The method as described in claim 7 further including adjusting the relative weightings for the security knowledge bases.

9. The method as described in claim 1 further including automatically adjusting the relative weighting of the security knowledge bases in the set of security knowledge bases based on a determined accuracy of the computed priority.

10. An apparatus, comprising:
    a processor;
    computer memory holding computer program instructions executed by the processor to characterize and respond to a cyber threat assessment, the cyber threat assessment having an initial severity indicia and comprising a set of one or more threat indicators, the computer program instructions including program code configured to:
    associate a relative weighting to each security knowledge base in a set of security knowledge bases;
    receive a data set identifying a set of characteristics associated with an enterprise;
    for at least one threat indicator in the set, initiate a query programmatically to each of the security knowledge bases, wherein the query to at least one of the security knowledge bases is scoped by information in the data set;
    receive responses to the queries programmatically, wherein a response provides an indication that the threat indicator identified in the query has been seen in data sources comprising the security knowledge base;
    adjust the initial severity indicia based on the relative weighting and the indications returned from querying the security knowledge bases to compute and output a priority; and
    take an action based on the priority.

11. The apparatus as described in claim 10 wherein the action is one of: adjusting an investigative workflow, issuing a notification or alert, updating a security analysis visualization, and providing a command to execute an external computing action.

12. The apparatus as described in claim 10 wherein the set of characteristics are one of: one or more industries associated with the enterprise, and one or more geographic areas associated with activities of the enterprise.

13. The apparatus as described in claim 10 wherein the security knowledge bases comprise one of: a managed security service that collects, aggregates and anonymizes security events from multiple entities; a cyber threat intelligence service that generates and provides knowledge graph-based per threat indicator risk indicia, and a federated search engine that searches across one or more enterprise-connected SIEM or non-SIEM data sources.

14. The apparatus as described in claim 10 wherein the cyber threat assessment is an advisory having a text description of a cyber-attack, a threat indicator in the advisory is an Indicator of Compromise (IOC), and the initial severity indicia provided in the advisory is specified as a result of a security analysis.

15. The apparatus as described in claim 10 further including program code configured to receive additional responses from the set of one or more knowledge bases and update the priority based at least in part of indications identified in the additional responses.

16. The apparatus as described in claim 10 wherein the program code configured to adjust the initial severity indicia based on the indications returned from querying the security knowledge bases comprises program code further configured to:
  normalize the initial severity indicia to generate a sub-score;
  generate a sub-score for a particular security knowledge base by multiplying a weighting for the weighting for a particular security knowledge base together with a value associated with a number of indications for that particular security knowledge base; and
  compute the priority based on the sub-scores.

17. The apparatus as described in claim 16 wherein the program code is further configured to adjust the relative weightings for the security knowledge bases.

18. The apparatus as described in claim 10 wherein the program code is further configured to automatically adjust the relative weighting of the security knowledge bases in the set of security knowledge bases based on a determined accuracy of the computed priority.

19. A computer program product in a non-transitory computer readable medium for use in a data processing system to characterize and respond to a cyber threat assessment, the cyber threat assessment having an initial severity indicia and comprising a set of one or more threat indicators, the computer program product holding computer program instructions that, when executed by the data processing system, are configured to:
  associate a relative weighting to each security knowledge base in a set of security knowledge bases;
  receive a data set identifying a set of characteristics associated with an enterprise;
  for at least one threat indicator in the set, initiate a query programmatically to each of the security knowledge bases, wherein the query to at least one of the security knowledge bases is scoped by information in the data set;
  receive responses to the queries programmatically, wherein a response provides an indication that the threat indicator identified in the query has been seen in data sources comprising the security knowledge base;
  adjust the initial severity indicia based on the relative weighting and the indications returned from querying the security knowledge bases to compute and output a priority; and
  take an action based on the priority.

20. The computer program product as described in claim 19 wherein the action is one of: adjusting an investigative workflow, issuing a notification or alert, updating a security analysis visualization, and providing a command to execute an external computing action.

21. The computer program product as described in claim 19 wherein the set of characteristics are one of: one or more industries associated with the enterprise, and one or more geographic areas associated with activities of the enterprise.

22. The computer program product as described in claim 19 wherein the security knowledge bases comprise one of: a managed security service that collects, aggregates and anonymizes security events from multiple entities; a cyber threat intelligence service that generates and provides knowledge graph-based per threat indicator risk indicia, and a federated search engine that searches across one or more enterprise-connected SIEM or non-SIEM data sources.

23. The computer program product as described in claim 19 wherein the cyber threat assessment is an advisory having a text description of a cyber-attack, a threat indicator in the advisory is an Indicator of Compromise (IOC), and the initial severity indicia provided in the advisory is specified as a result of a security analysis.

24. The computer program product as described in claim 19 further including computer program instructions configured to receive additional responses from the set of one or more knowledge bases and update the priority based at least in part of indications identified in the additional responses.

25. The computer program product as described in claim 19 wherein the computer program instructions configured to adjust the initial severity indicia based on the indications returned from querying the security knowledge bases comprises computer program instructions further configured to:
  normalize the initial severity indicia to generate a sub-score;
  generate a sub-score for a particular security knowledge base by multiplying a weighting for the weighting for a particular security knowledge base together with a value associated with a number of indications for that particular security knowledge base; and
  compute the priority based on the sub-scores.

26. The computer program product as described in claim 25 wherein the computer program instructions are further configured to adjust the relative weightings for the security knowledge bases.

27. The computer program product as described in claim 19 wherein the computer program instructions are further configured to automatically adjust the relative weighting of the security knowledge bases in the set of security knowledge bases based on a determined accuracy of the computed priority.

28. A network-accessible threat intelligence method for characterizing a cyber threat assessment, the cyber threat assessment having an initial severity indicia and comprising a set of one or more threat indicators, comprising:
  associating a relative weighting to each security knowledge base in a set of security knowledge bases;
  for each of set of enterprise entities, receiving a data set identifying a set of characteristics associated with the enterprise entity;
  for at least one threat indicator in the set, initiating a query programmatically to each of the security knowledge bases, wherein the query to at least one of the security knowledge bases for each of the enterprise entities is scoped by information in the data set received from the enterprise entity;
  receiving responses to the queries programmatically, wherein a response provides an indication that the threat indicator identified in the query has been seen in data sources comprising the security knowledge base;
  adjusting the initial severity indicia based on the relative weighting and the indications returned from querying the security knowledge bases to compute and output to each enterprise entity an indication of a severity of the cyber threat with respect to the enterprise entity;

wherein an indication of the severity associated with a first enterprise entity is distinct from an indication of the severity associated with a second enterprise entity.

* * * * *